(12) United States Patent
Tilsner et al.

(10) Patent No.: US 6,409,255 B2
(45) Date of Patent: Jun. 25, 2002

(54) VEHICLE BODY FOR A FORWARD VEHICLE STRUCTURE OF A MOTOR VEHICLE AND METHOD OF MAKING SAME

(75) Inventors: Michael Tilsner, Wiernsheim; Rainer Stahl, Markgroeningen; Matthias Herntier, Wurmberg, all of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/853,082

(22) Filed: May 11, 2001

(30) Foreign Application Priority Data

May 11, 2000 (DE) .......................................... 100 23 193

(51) Int. Cl.$^7$ ............................................... B60D 27/02
(52) U.S. Cl. .................... 296/194; 296/198; 296/203.02
(58) Field of Search ........................ 296/29, 187, 193, 296/194, 198, 203.01, 203.02

(56) References Cited

U.S. PATENT DOCUMENTS

| 3,044,822 A | * | 7/1962 | Dean et al. ............ 296/203.02 |
| 4,440,435 A | * | 4/1984 | Norlin ........................ 296/194 |
| 4,763,948 A | * | 8/1988 | Harasaki ..................... 296/194 |
| 4,919,474 A | * | 4/1990 | Adachi et al. .............. 296/194 |
| 5,201,566 A | * | 4/1993 | Mori .......................... 296/194 |
| 5,271,473 A | * | 12/1993 | Ikeda et al. ................. 296/194 |
| 5,320,403 A | * | 6/1994 | Kazyak ........................ 296/29 |
| 5,409,289 A | * | 4/1995 | Kalian et al. ............... 296/194 |
| 6,010,182 A | * | 1/2000 | Townsend ............. 296/203.01 |
| 6,170,906 B1 | * | 1/2001 | Kasuga .................. 296/203.02 |

FOREIGN PATENT DOCUMENTS

| JP | 363263176 A | * | 10/1988 | ............ 296/203.02 |
| JP | 403213473 A | * | 9/1991 | ............ 296/203.02 |
| JP | 404002579 A | * | 1/1992 | ................ 296/194 |
| JP | 404197880 A | * | 7/1992 | ................ 296/194 |
| JP | 404303075 A | * | 10/1992 | ............ 296/203.02 |
| JP | 406191437 A | * | 7/1994 | ............ 296/203.02 |

* cited by examiner

Primary Examiner—Stephen T. Gordon
Assistant Examiner—Gregory Blankenship
(74) Attorney, Agent, or Firm—Crowell & Moring LLP

(57) ABSTRACT

Vehicle body for a forward vehicle structure of a motor vehicle, including a support structure, a fender support and a fender panel. The fender panel being optionally replaceable by another fender panel, so that a modified course of a joint between a front flap and the fender can be achieved. Furthermore, the support structure is constructed in a stable manner in connection with the side members, so that an optimal crash behavior can be achieved.

31 Claims, 4 Drawing Sheets

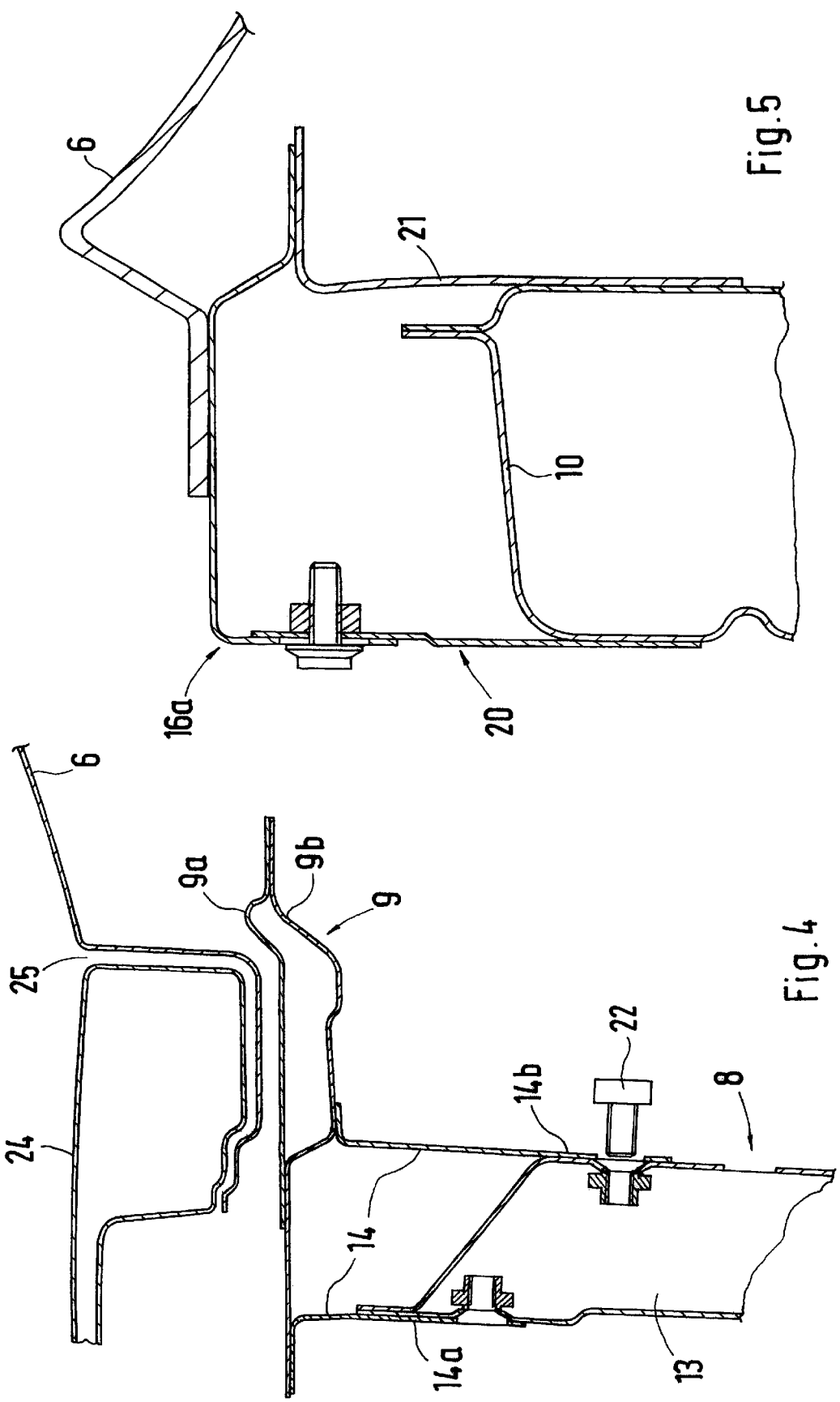

VEHICLE BODY FOR A FORWARD VEHICLE STRUCTURE OF A MOTOR VEHICLE AND METHOD OF MAKING SAME

BACKGROUND AND SUMMARY OF THE INVENTION

This application claims the priority of German Patent Document 100 23 193.4, filed in Germany, May 11, 2000, the disclosure of which is expressly incorporated by reference herein.

The invention relates to a vehicle body for a forward vehicle structure of a motor vehicle having laterally extending vehicle side members as well as a support structure fastened thereto which can be connected with an A-column of the vehicle body, a fender being fastened on an arm of the support structure.

From German Patent Document DE 42 09 879 A1, a forward body structure of a vehicle is known which is constructed as a frame and comprises supports which are connected with the A-column of the vehicle and extend toward the front in the driving direction. A transversely extending front frame is connected with the frame on the front side, a fender being fastenable on a support of the frame.

It is an object of the invention to provide a forward vehicle body of a motor vehicle which has a support structure which, on the one hand, ensures a simple fastening of the fender as well as an accommodation of different front flaps and, on the other hand, ensures a stable forward vehicle structure.

According to certain preferred embodiments of the invention, this object is achieved by providing a vehicle body for a forward vehicle structure of a motor vehicle, having laterally extending vehicle side members as well as a support structure fastened thereto which can be connected with an A-column of the vehicle body, a fender being fastened on the support structure, wherein the support structure has one T-shaped profile support respectively for each vehicle side which is connected on a forward end with a respective vehicle side member, each T-shaped profile support member including an upward-extending foot web connected to a forward end of a fender panel, and a transversely outward-directed center web connected with a forward end of a fender support.

Important advantages achieved by the invention are that the two fender panels of the forward vehicle structure can be connected with the support structure in a simple manner, for example, by fastening screws. It is therefore easily possible to use differently constructed fender panels in the forward vehicle structure in order to design the front flap with its connecting edges according to the vehicle type to be produced. This means that the joint between the front flap and the fender can be arranged arbitrarily. For this purpose, the support structure has one T-shaped profile support respectively which is connected with the side member and which, with an upward-pointing foot web, is fastened on the end side on the fender panel, an outward-directed transversely situated center web being connected with a fender support on the end side.

In certain preferred embodiments, the fender panels of both sides are V-shaped viewed in the driving direction and are arranged at an acute angle with respect to the support profile, the fender being arranged at a distance from the interior side member.

In certain preferred embodiments, the profile support held on the side member is arranged on the front side of the fender panel and is connected with the latter, the foot web of the profile support standing with a lower end on the side member and extending approximately vertically with respect to a connection element of the fender panel which ends on the A-column. The center web of the profile support is provided to be extending approximately horizontally and transversely directed to the exterior side of the vehicle and, with its free end, is connected with the fender support. As a result of this construction of the support structure, a stable forward vehicle structure is created which, in addition to permitting an accessible and simple fastening of the fender, also allows a fastening of the front end part. The support structure is supported directly on the A-column of the vehicle, so that, in the event of a front crash, in the interaction with the side member, an energy-absorbing forward vehicle structure is also provided.

The fender panel preferably comprises a profiled top and bottom part, which are connected with one another, the top part receiving a profiled shaped-out fender section and being connected therewith, and the engine hood being held resting on the top part. For connecting the fender panel with the profile support and with the fender support, connection elements are provided which are made of U-shaped and/or angular sheet metal elements. For this fastening, the connection elements can have different constructions, so that the corresponding fastening points between the fender panel and the profile support and the fender support can be designed to correspond to one another.

Other objects, advantages and novel features of the present invention will become apparent from the following detailed description of the invention when considered in conjunction with the accompanying drawings.

BRIEF DESCRIPTION OF THE DRAWINGS

FIG. 4 is a vertical sectional view of a forward connection element between the profile support and the fender panel; and FIG. 5 is a view of another embodiment of a forward fastening between the profile support and the fender panel.

DETAILED DESCRIPTION OF THE DRAWINGS

Figure 1:
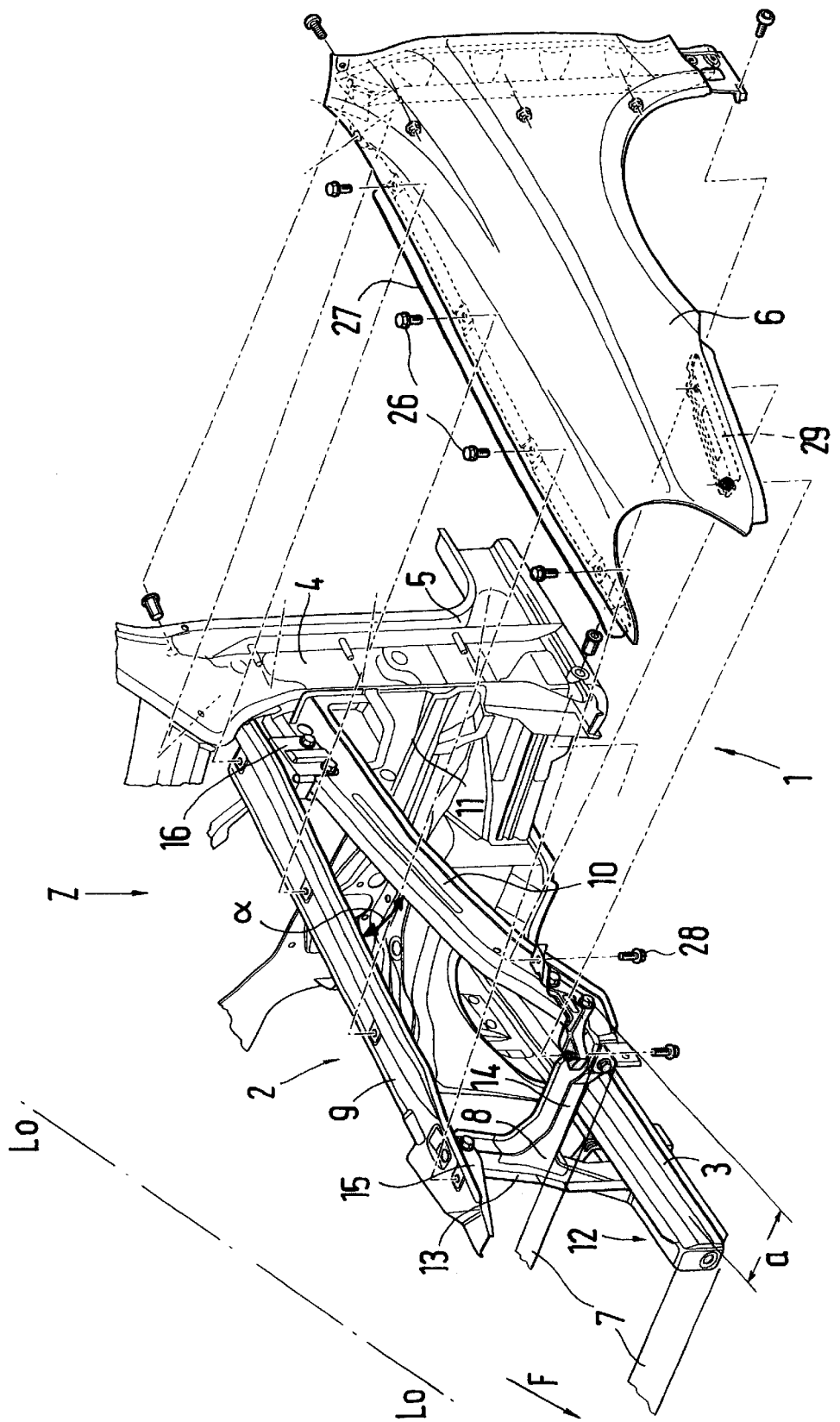
FIG. 1 is a diagrammatic representation of a forward vehicle structure constructed according to preferred embodiments of the invention, only the left side of the forward vehicle end being shown with respect to the driving direction.

The forward vehicle structure 1 of a motor vehicle comprises a support structure 2 which is connected on each vehicle side with a side member 3 and an A-column 4 of the vehicle body. The A-columns are connected with a side wall 5 and a front wall of the vehicle. Together with the support structure 2, a fender is laterally provided and, on the front side, a transversely arranged front end part 7 is provided which is not shown in detail.

The support structure 2, in each case, comprises a T-shaped profile support 8 connected with the side member 3 as well as a fender panel 9 and a fender support 10 with a bearing support 11.

With respect to the driving direction F, the profile support 8 is fastened on the forward end 12 of the side member 3, and the fender panel 9 and the fender support member 10 extend from this profile support 8 against the driving direction F to the A-column 4, and at least the fender support member 10 is connected with this A-column 4.

The profile support 8 has a foot web 13 extending from the side member 3 vertically upward as well as a center web 14 extending from the side member 3 transversely to the outside and approximately horizontally. At the free upper end of the foot web 13, fender panel 9 is fastened by way of a connection element 15. With its free end, the fender support 10 is connected on the end side to the center web 14. Close to the A-column 4, the fender panel 9 is held by way of another connection element 16; 16a on the fender support 10 and is fixed by way of fastening screws 17.

Viewed from above in the direction Z, the fender panels 9 of both vehicle sides extend V-shaped with respect to one another in the driving direction, and in addition, the fender panel 9 is arranged with respect to the fender support 10 at an acute angle α, the fender panel 9 being situated above the fender support 10 which, because of the T-profile support 8, is arranged at a distance "a" with respect to the side member 3 and displaced toward the exterior side of the vehicle.

The fender panel 9 includes a profiled top part 9a and a profiled bottom part 9b which may have a different cross-sectional shape along the length.

Figure 3:
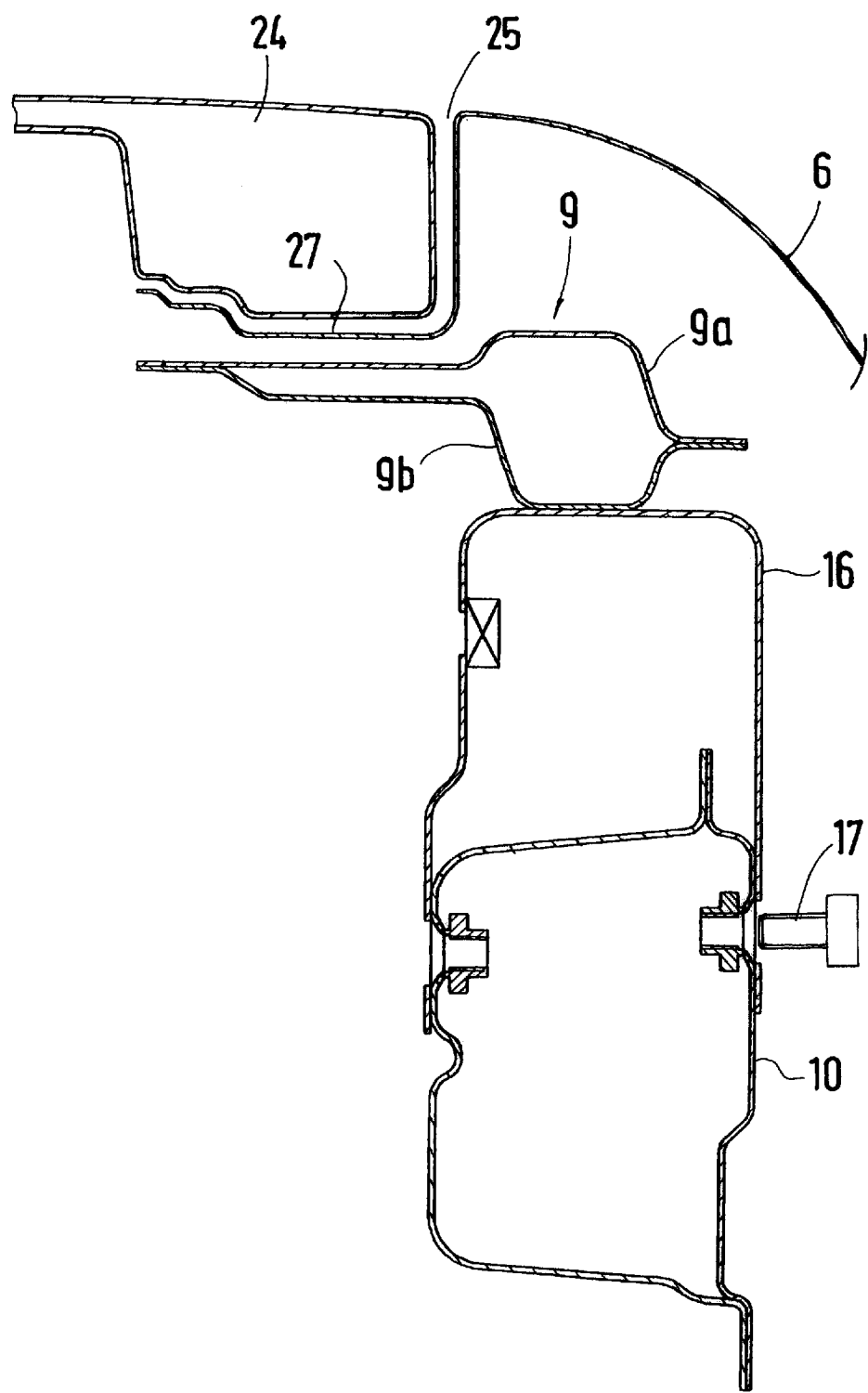
FIG. 3 is a vertical sectional view of a rearward connection element between the fender support and the fender panel.

As illustrated in detail in FIG. 3, the connection element 16 situated in the rear includes a U-shaped profile, whose legs reach from both sides over the fender support 10, and are connected with the latter by way of screwed connections.

As illustrated in detail in FIG. 4, the connection element 14 situated in the front includes reinforcing metal sheets 14a, 14 which reach from both sides over the free end of the foot web 13 of the profile support 8 and are connected with the profile support by way of screwing devices.

According to another embodiment of FIG. 5, the rearward connection 16a of the fender panel 9 is formed by a profile including two assembled angular metal sheets 20, 21 which reach over the fender support 10 from both sides. The fender 6 is connected with the angular metal sheet 20 on the web side.

Figure 2:
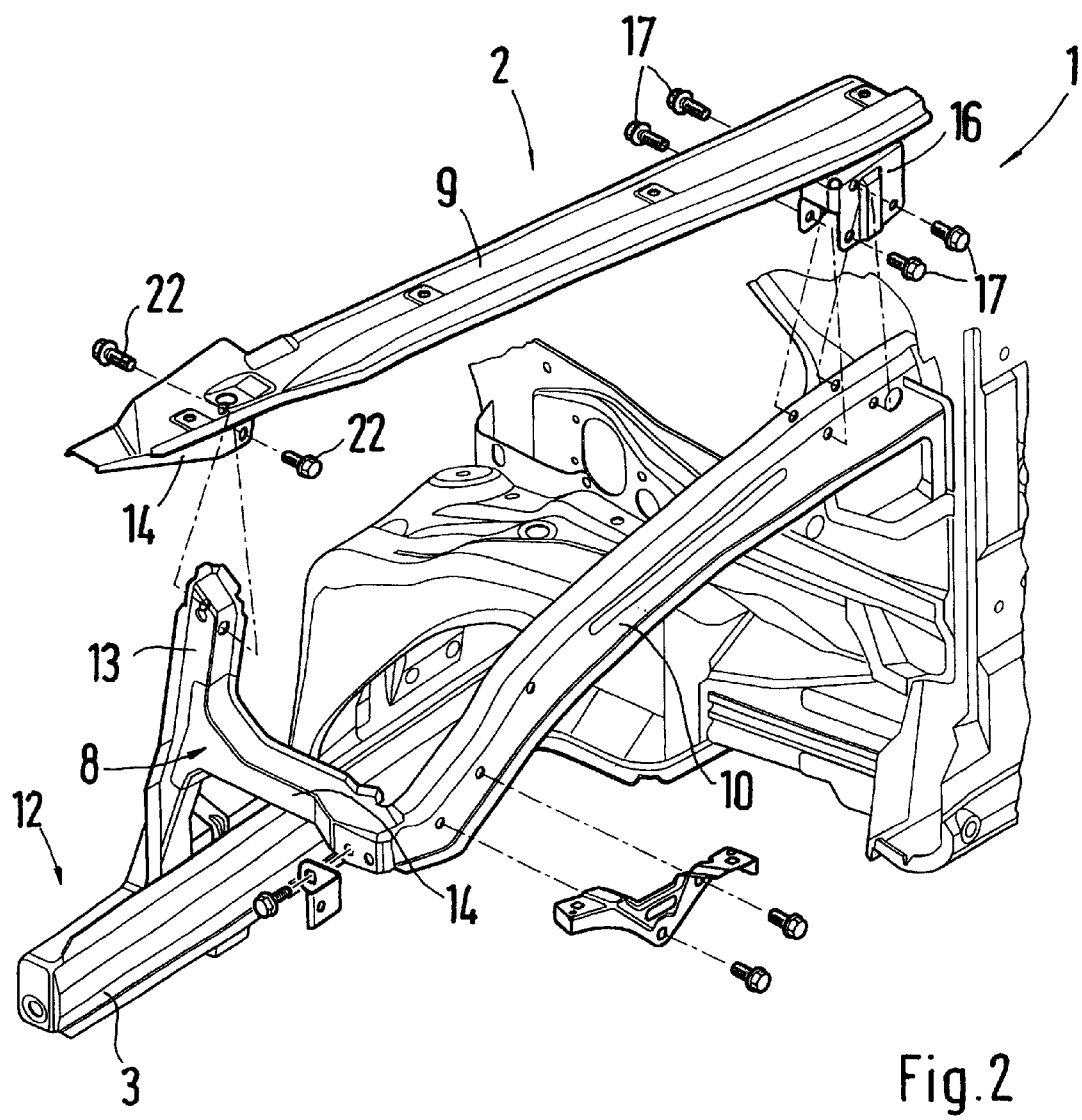
FIG. 2 is a diagrammatic representation of the forward vehicle structure according to FIG. 1, shown with the fender panel not yet fastened.

As illustrated in detail in FIG. 2, the fender panel 9 is connected by way of the connection elements 14, 16; 16a with the support structure 2 by screwing devices 17, 22. The fender panel 9 can be replaced by another fender panel of different configurations, which can be used with another front flap 24 for a modified vehicle. This means that the V-shaped joint 25 between the front flap 24 and the fender 6 may have a different course because of the exchange of the fender panel 9.

The fender 6 is fastened on the fender panel 9 with its upper shaped-out fender section 27 by means of screws 26, as illustrated in detail in FIG. 1. An underside fastening of the fender 6 takes place at least by way of screws 28 and a connection element 29 on the fender support 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Vehicle body for a forward vehicle structure of a motor vehicle, having laterally extending vehicle side members as well as a support structure fastened thereto which can be connected with an A-column of the vehicle body, a fender being fastened on the support structure, wherein the support structure has one T-shaped profile support respectively for each vehicle side which is connected on a forward end with a respective vehicle side member, each T-shaped profile support member including an upward-extending foot web connected to a forward end of a fender panel and, a transversely outward-directed center web connected with a forward end of a fender support.

2. Vehicle body according to claim 1, wherein the respective fender panels of both vehicle sides extend in a V-shape with respect to a driving direction F, wherein the respective fender panels extend at an acute angle toward the front with respect to respective fender supports, and wherein the fender supports are arranged displaced a distance laterally outside of respective side members.

3. Vehicle body according to claim 1, wherein the foot web of the profile support is connected by a lower end standing on the side member and extends approximately vertically to a connection element of the fender panel which ends on the A-column.

4. Vehicle body according to claim 2, wherein the foot web of the profile support is connected by a lower end standing on the side member and extends approximately vertically to a connection element of the fender panel which ends on the A-column.

5. Vehicle body according to claim 1, wherein the center web of the profile support extends approximately horizontally and transversely with respect to the exterior side of the vehicle and is connected by means of its free end with the fender support.

6. Vehicle body according to claim 2, wherein the center web of the profile support extends approximately horizontally and transversely with respect to the exterior side of the vehicle and is connected by means of its free end with the fender support.

7. Vehicle body according to claim 3, wherein the center web of the profile support extends approximately horizontally and transversely with respect to the exterior side of the vehicle and is connected by means of its free end with the fender support.

8. Vehicle body according to claim 1, wherein the fender panel comprises a profiled top and bottom part which are connected with one another, the top part receiving a profiled shaped-out fender section and being connected with the latter and in which an edge of an engine hood is held while resting upon it.

9. Vehicle body according to claim 2, wherein the fender panel comprises a profiled top and bottom part which are connected with one another, the top part receiving a profiled shaped-out fender section and being connected with the latter and in which an edge of an engine hood is held while resting upon it.

10. Vehicle body according to claim 3, wherein the fender panel comprises a profiled top and bottom part which are connected with one another, the top part receiving a profiled shaped-out fender section and being connected with the latter and in which an edge of an engine hood is held while resting upon it.

11. Vehicle body according to claim 4, wherein the fender panel comprises a profiled top and bottom part which are connected with one another, the top part receiving a profiled shaped-out fender section and being connected with the latter and in which an edge of an engine hood is held while resting upon it.

12. Vehicle body according to claim 1, wherein the fender panel has a connection element on its free end facing the A-column, which connection element consists of a U-profile which, by means of its legs, reaches over the fender support from above and is fastened thereto.

13. Vehicle body according to claim 12, wherein the connection element for the fender panel on the fender support on its free end facing the A-column consists of a U-shaped profile part which is held on the fender support by means of an inner angular reinforcement and a closing part situated on the outside.

14. Vehicle body according to claim 1, wherein the fastening of the fender panel on a free upright end of the foot web of the profile support takes place by way of a reinforcing element having reinforcing metal sheets, which reinforcing element is arranged at least on both sides of the foot web and is connected with the fender panel.

15. Vehicle body according to claim 1, wherein the fender panel is connected by a shaped-out section of the fender on an upper side of the fender panel,
   wherein a forward area of the fender panel is connected to the profile support, and
   wherein a rearward area of the fender panel is connected to the fender support.

16. Vehicle body assembly comprising:
   a first fender panel,
   a first fender support, and
   a first T-shaped profile support having a first end section connectable with a first vehicle side member, a second end section connectable with the first fender panel, and a third end section connectable with the first fender support.

17. Vehicle body assembly according to claim 16, wherein the first end section of the first profile support is at a downwardly extending arm of the first profile support, wherein the second end section of the first profile support is at an upwardly extending arm of the first profile support, and wherein the third end section is at a laterally outwardly extending arm of the first profile support.

18. Vehicle body assembly according to claim 17, wherein respective forward ends of the first fender panel and first fender support are connected at the respective second and third end sections of the first profile support.

19. Vehicle body assembly according to claim 18, comprising a first vehicle A-frame member, wherein a rearward end of the first fender support is connected to the first A-frame member.

20. Vehicle body assembly according to claim 18, wherein a rearward end of the first fender panel is connected to the first fender support.

21. Vehicle body assembly according to claim 16, comprising:
   a second fender panel,
   a second fender support, and
   a second T-shaped profile support having a first end section connectable with a second vehicle side member, a second end section connectable with the second fender panel, and a third end section connectable with the second fender support.

22. Vehicle body assembly according to claim 21, wherein said T-shaped profile supports, fender panels and fender supports are arranged in use symmetrically with respect to a vehicle centerline such that the fender panels extend in a V-shape with respect to the fender supports with the forward ends of the fender supports laterally outward of the forward ends of the fender panels.

23. Vehicle body assembly according to claim 22, comprising fenders supported at the respective fender panels and fender supports.

24. Vehicle body assembly according to claim 16, comprising screw connectors for detachable connecting the T-shaped profile with the fender panels and fender supports.

25. A vehicle body assembly comprising:
   a vehicle side member,
   a vehicle A-frame member disposed behind and connected with the vehicle side member,
   a first fender panel,
   a first fender support, and
   a first T-shaped profile support having a first end section connected with the first vehicle side member, a second end section connected with the first fender panel, and a third end section connected with the first fender support.

26. Vehicle body assembly according to claim 25, wherein the first end section of the first profile support is at a downwardly extending arm of the first profile support, wherein the second end section of the first profile support is at an upwardly extending arm of the first profile support, and wherein the third end section is at a laterally outwardly extending arm of the first profile support.

27. A vehicle body according to claim 26,
   wherein a rearward end of the first fender support is connected to the A-frame member.

28. Vehicle body assembly according to claim 27, wherein a rearward end of the first fender panel is connected to the first fender support.

29. Vehicle body assembly according to claim 25, wherein a second assembly is arranged symmetrically with respect to a vehicle longitudinal center line.

30. Vehicle body assembly according to claim 29, comprising fenders supported at the respective fender panels and fender supports.

31. A method of making a vehicle body assembly comprising:
   providing a vehicle frame with a side member and an A-frame member connected to the side member,
   providing a T-shaped profile,
   connecting a downwardly extending arm of the T-shaped profile to the side member,
   providing a fender panel,
   connecting an upwardly extending arm on the T-shaped profile with a forward end of the fender panel,
   providing a fender support,
   connecting a laterally outwardly extending arm of the T-shaped profile with a forward end of the fender support,
   connecting a rearward end of the fender support with the A-frame member, and
   connecting a rearward end of the fender panel with the fender support.

* * * * *